US012402602B1

(12) United States Patent
Stone et al.

(10) Patent No.: US 12,402,602 B1
(45) Date of Patent: Sep. 2, 2025

(54) PET TOY WITH ADJUSTABLE FOOD ITEM HOLDER

(71) Applicant: Guru Pet Company, Inc., Mount Pleasant, SC (US)

(72) Inventors: John Stone, Mount Pleasant, SC (US); Amy Stone, Mount Pleasant, SC (US)

(73) Assignee: Guru Pet Company, Inc., Mount Pleasant, SC (US)

( * ) Notice: Subject to any disclaimer, the term of this patent is extended or adjusted under 35 U.S.C. 154(b) by 0 days.

(21) Appl. No.: 18/793,206

(22) Filed: Aug. 2, 2024

Related U.S. Application Data

(60) Provisional application No. 63/532,128, filed on Aug. 11, 2023.

(51) Int. Cl.
 *A01K 15/02* (2006.01)
(52) U.S. Cl.
 CPC .................... *A01K 15/026* (2013.01)
(58) Field of Classification Search
 CPC ................................................ A01K 15/026
 See application file for complete search history.

(56) References Cited

U.S. PATENT DOCUMENTS

| 10,701,900 B1* | 7/2020 | Shrestha | A01K 15/026 |
| 2020/0154676 A1* | 5/2020 | Walt | A01K 15/026 |
| 2021/0212290 A1* | 7/2021 | Stern | A01K 15/026 |
| 2023/0165219 A1* | 6/2023 | Zheng | A01K 15/026 |
| | | | 119/707 |
| 2023/0232787 A1* | 7/2023 | Karras | A01K 15/026 |
| | | | 119/709 |
| 2024/0147964 A1* | 5/2024 | Tanoury | A01K 5/0114 |

* cited by examiner

*Primary Examiner* — Jessica B Wong
(74) *Attorney, Agent, or Firm* — Standley Law Group LLP; James L. Kwak; Adam J. Smith

(57) ABSTRACT

A pet toy for adjustably accommodating various size and shape food items and related methods are provided. A first and second outer component each include a first portion extending within a housing, a second portion extending outside of the housing, and a third portion between said first portion and said second portion engaged to the housing. A first and second inner component are located within the housing and each engage one of the outer components. A through aperture is defined, at least in part, by the housing. The first and second outer components are configured for rotational movement relative to the housing to cause movement of the first and second inner components, respectively, within the housing, thereby adjusting a size of the through aperture.

20 Claims, 5 Drawing Sheets

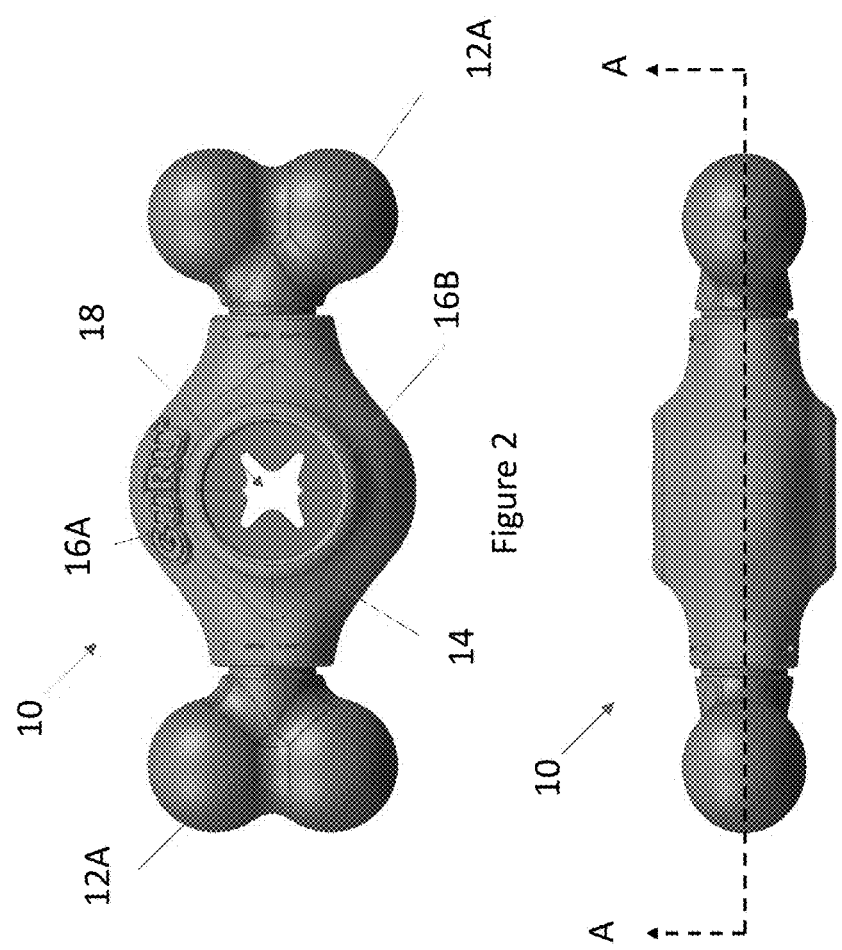
Figure 2
Figure 3
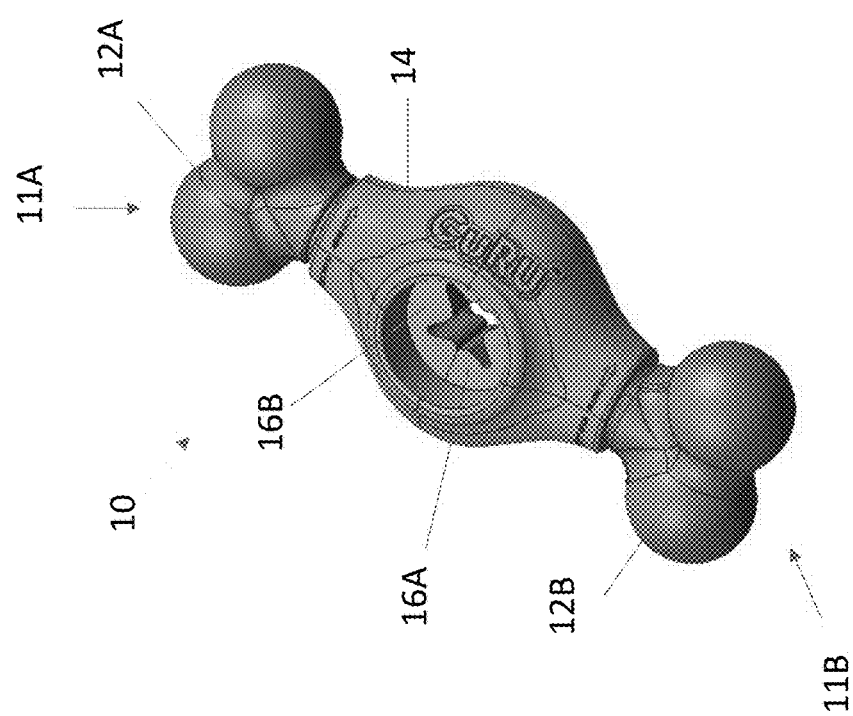
Figure 1

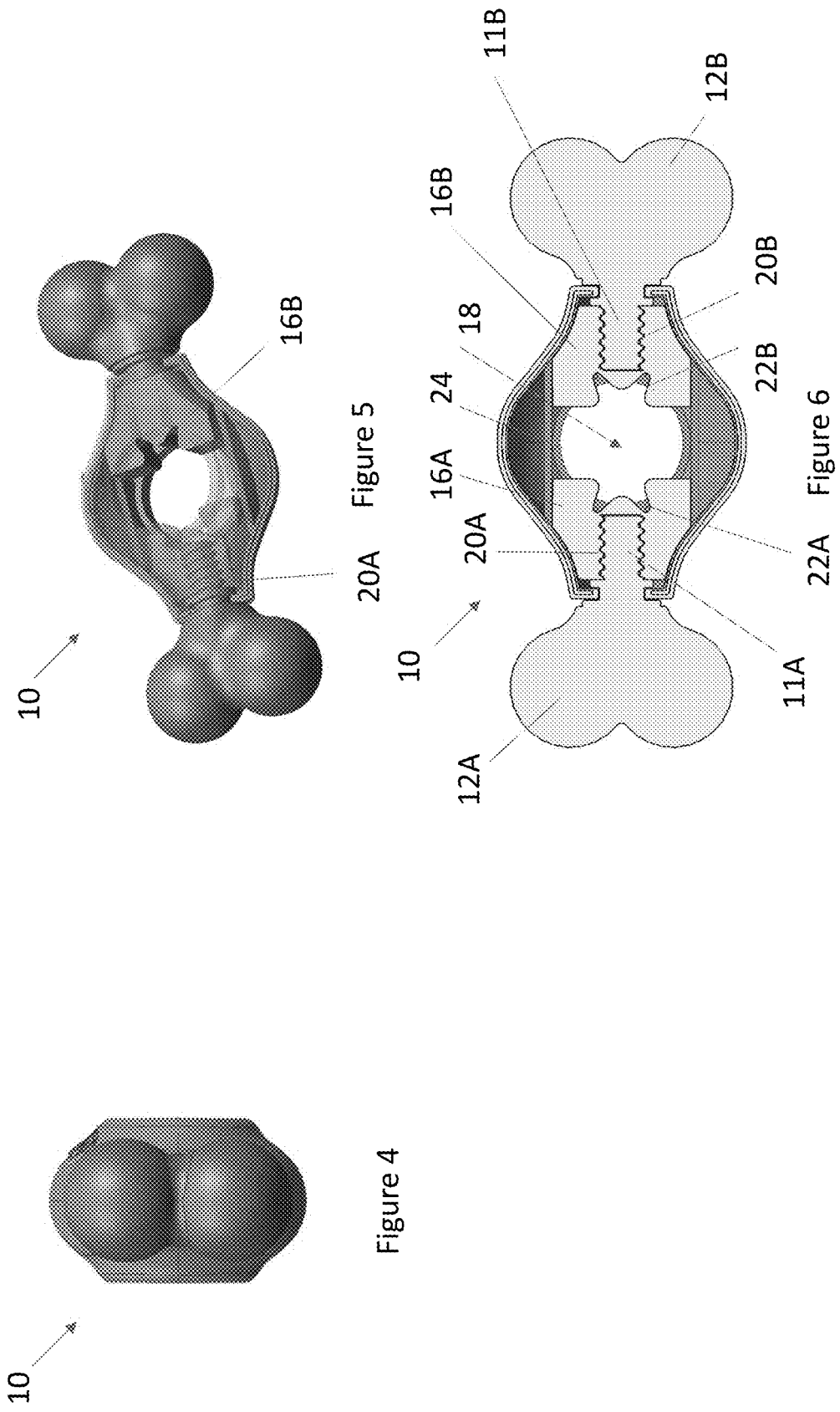

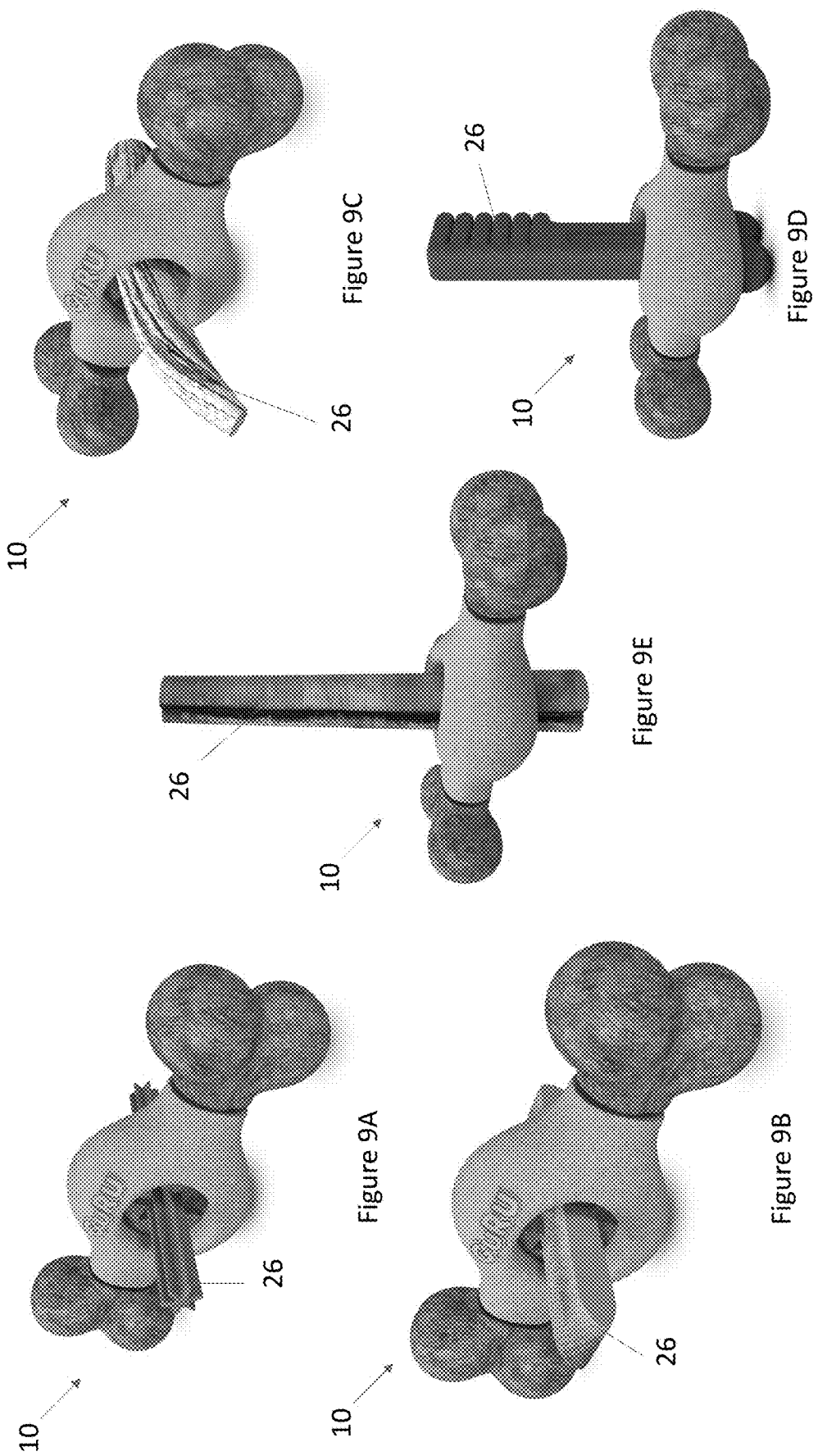

PET TOY WITH ADJUSTABLE FOOD ITEM HOLDER

CROSS-REFERENCE TO RELATED APPLICATIONS

This application claims the benefit of U.S. provisional application Ser. No. 63/532,128, filed Aug. 11, 2023, the disclosures of which are hereby incorporated by reference as if fully restated herein.

TECHNICAL FIELD

Exemplary embodiments relate generally to pet toys, such as with adjustable food item holders.

BACKGROUND AND SUMMARY OF THE INVENTION

Pets and other animals need stimulation and play to remain healthy. A variety of pet toys are known. A variety of pet food items are known which are consumable or non-consumable and provide stimulation and/or teeth cleaning, by way of example. These food items are sometimes referred to as "chews". However, some pets are reluctant to play with certain toys or consume certain chews for a variety of reasons, not all of which are entirely well understood. Furthermore, chewing on at least certain types of chews can be difficult for some pets based on their spatial orientation. Regardless, what is needed are pet toys which adjustably accept a wide variety of pet chews.

A pet toy with which is adjustable to accept a wide variety of pet chews is provided. The toy may include a housing for first and second inner components. The inner components may each be configured to receive a threaded portion of a shaft of a first and second outer component, respectively. The outer components may be secured to the housing, such as by way of a ridge in each of two side openings in the housing which engage an unthreaded portion of the shaft. The outer components may engage the inner components such that a portion of the outer components remain exposed outside the housing, such as for chewing by the pet, and another portion extends within the housing, such as to connect with the inner components. The inner components may be advanced and retracted relative to another by relative rotational movement of the outer components.

The toy may include a through opening which extends from an upper and lower opening in the housing and between the inner components. The inner components may contact when fully advanced, by may include an unevenly shaped inner surfaces which provide a through opening in the toy even when the inner components are fully advanced. The inner components may be advanced or retracted along the threaded shafts by relative rotational movement of the outer portions to increase and decrease a size of the through opening, thereby accommodating and securing chews of various size, shape, and/or kind, such as by clamping forces exerted by the inner components against the chew.

Walls may be provided within the housing to guide the advancement and retraction of the inner components.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 1 is perspective view of an exemplary adjustable pet toy;

FIG. 2 is a top view of the pet toy of FIG. 1;

FIG. 3 is a front view of the pet toy of FIG. 1;

FIG. 4 is a left side view of the pet toy of FIG. 1;

FIG. 5 is a perspective, partially sectioned view of the pet toy of FIG. 1 taken along section line A-A of FIG. 3 with various levels of transparency to certain components;

FIG. 6 is a sectional top, plan view of the pet toy of FIG. 1 taken along section line A-A of FIG. 3;

FIG. 9A is a front perspective view of the pet toy of FIG. 1 with an exemplary chew inserted;

FIG. 9B is a front perspective view of the pet toy of FIG. 1 with another exemplary chew inserted;

FIG. 9C is a front perspective view of the pet toy of FIG. 1 with another exemplary chew inserted;

FIG. 9D is a side perspective view of the pet toy of FIG. 1 with another exemplary chew inserted; and FIG. 9E is a side perspective view of the pet toy of FIG. 1 with another exemplary chew inserted.

DETAILED DESCRIPTION OF EXEMPLARY EMBODIMENT(S)

Figure 7:
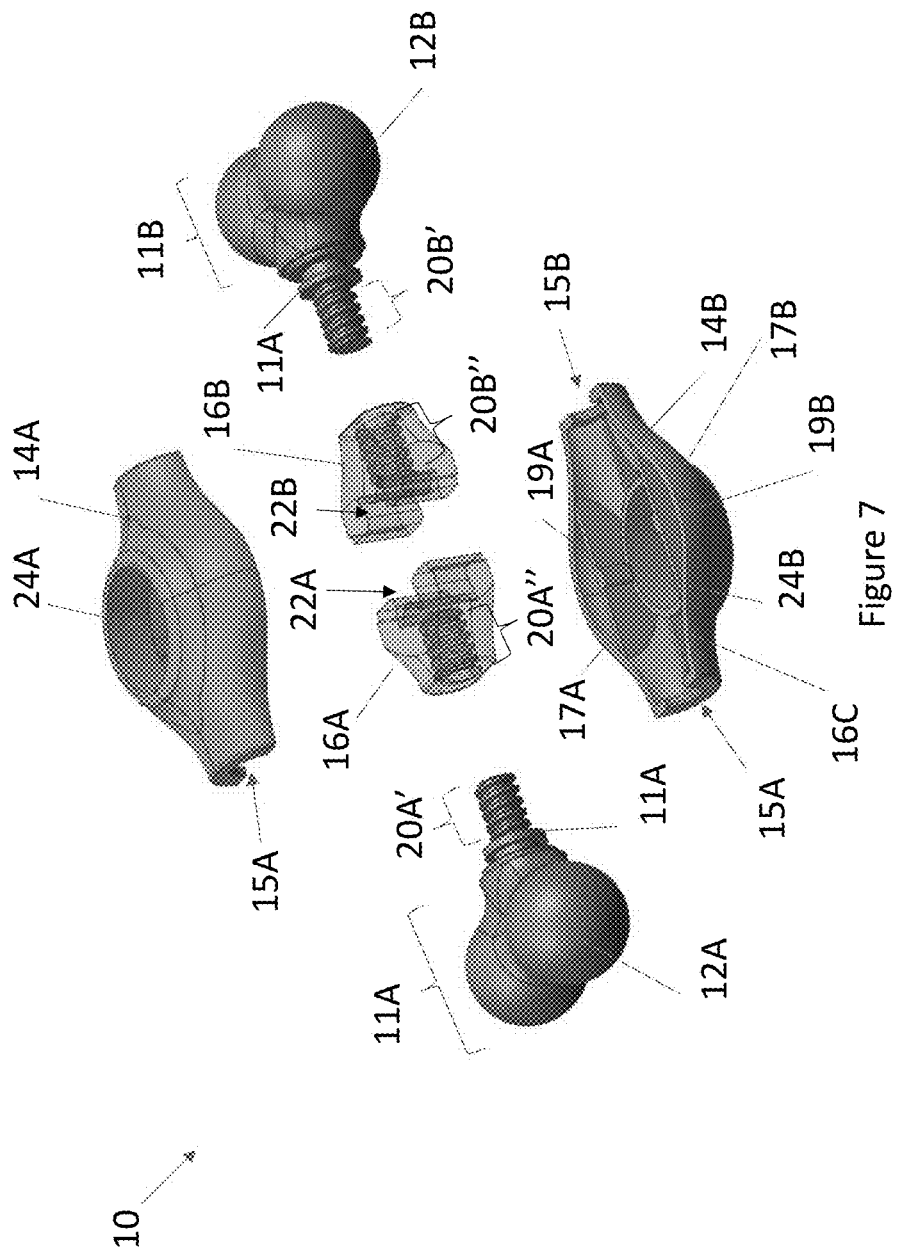
FIG. 7 is an exploded perspective view of the pet toy of FIG. 1.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

FIG. 1 through FIG. 9E illustrate an exemplary pet toy 10 with adjustable features to accommodate a wide variety of types, kinds, and/or sizes of chews 26. The toy 10 may comprise first and second outer components 12A, 12B.

The toy 10 may comprise a housing 14. The housing 14 may accommodate the inner components 16 therein and/or a portion of the outer components 12. The housing 14 may be provided in two parts 14A, 14B, such as substantially (e.g., within 10%) equal halves, though such is not required. The parts 14A, 14B may be joined along a seam which preferably extends in a longitudinal plane. Joining may be accomplished by way of thermal bonding, snap fit, welding (e.g., ultrasonic welding), adhered, fastened, combinations thereof, or the like.

Exposed portions 11A, 11B of the first and second outer components 12A, 12B may remain outside the housing 14. The exposed portions 11A, 11B may be shaped as a bone end, by way of non-limiting example. Various shape may be utilized. The first and second outer components 12A, 12B may comprise shafts 11A, 11B, respectively. The shafts 11A, 11B may comprise threaded portions 20A', 20B', respectively and unthreaded portions. At least the threaded portions 20A', 20B' may remain inside the housing 14. The threaded portions 20A', 20B' may be configured to mate with threaded portions 20A", 20B", respectively, provided on first and second inner components 16A, 16B, respectively. The threaded portions 20A", and 20B" may be provided along cylindrically shaped hollow cavities in the inner components 16A, 16B, respectively. In exemplary embodiments, without limitation, the unthreaded portions of the shafts 11 may include an annular or other shaped protrusion 21A, 21B. Relative rotation of the inner and outer components 16, 12 may cause relatively advancement or retraction thereof. In exemplary embodiments, such relative rotation is caused by manual grasping and rotation of the exposed portions 11A, 11B.

The housing 14 may be joined over the inner components 16 to secure the inner components therein. Before or after the parts 14A, 14B of the housing 14 are joined, the outer components 12 may be joined to the inner components 16, such as by mating the threaded portions 20A', 20B', 20A", 20B" thereof.

The housing 14 may comprise side openings 15A, 15B configured to accommodate the shaft 11A, 11B of the outer components 12A, 12B, respectively. The openings 15A, 15B may be formed when the two parts 14A, 14B of the housing 14 are joined, though such is not necessarily required. The shafts 11A, 11B may be secured at least partially internal to the openings 15A, 15B, respectively, and frictionally prevented from traveling therebeyond, such as by size of the openings 15A, 15B. In exemplary embodiments, without limitation, an unthreaded portion of the shafts 11 includes a surface feature which engages a portion of the housing forming the openings 15A, 15B, thereby securing the outer components 12A, 12B and preventing or inhibiting their removal. For example, without limitation the surface feature may comprise a ridge located within the housing which engages an interior facing portion of the housing forming the openings 15A, 15B. Alternatively, or additionally, the surface feature may comprise a valley which engages the portion of the housing forming the openings 15A, 15B which extends therein.

The toy 10 may define a through opening 18. The through opening 18 may be defined, at least in part, by upper and lower openings 24A, 24B, respectively, in the housing 14. The openings 24 may be substantially circular or oval in shape, though other shapes may be utilized. The through opening 18 may be further defined, at least in part, by the inner components 16A, 16B, such as by way of inward facing surface(s) 22A, 22B thereof. The inward facing surfaces 22A, 22B may comprise curved, jagged, uneven, textured, and/or angular surfaces and/or shapes, though such is not necessarily required. These may enhance grip on the chew.

In exemplary embodiments, the housing 14 holds the outer components 12 in a three-dimensionally fixed position which allows axial rotation of the outer components 16, which by mutual engagement of the threaded surfaces, causes axial advancement/retraction of the inner components 16 along the shafts 11, thereby enlarging or shrinking a size of the through opening 18.

Such relative rotation is preferably accomplished by manual twisting of the outer components 12, such as at the exposed portions 11, which may remain exposed from the housing 14. The inner components 16 are preferably retained within the housing 14 during such relative rotation such that, even at maximum advancement where the two inner portions 16 touch, they remain connected to the outer components 12. This may provide protection to such components, such as from interference or becoming dislodged. The housing 14 may comprise a generally curved shape to accommodate the inner components 16 as they are so moved.

The inner components of the housing 14 may comprise one or more features for retaining some or all of the components. By way of non-limiting example, the internal walls 17A, 17B may axially align the inner components 16A, 16B, such as during travel along the shafts 11. The internal walls 17 may extend within the housing 14, preferably longitudinally at least substantially (e.g., within 10% of) parallel to a centerline of the shafts 11. In this way, the internal walls 17 may guide the advancement and retraction of the inner components 16.

The internal walls 17 may be separate components from an outer wall of the housing 14, though optionally the internal walls 17 may be defined by the outer wall of the housing 14. Preferably, the internal walls 17 are integrally formed with the housing 14.

Protrusions 19A, 19B may be provided at some or all of the internal walls 17A, 17B, such as to prevent complete closure of the inner components 16A, 16B.

Figure 8B:
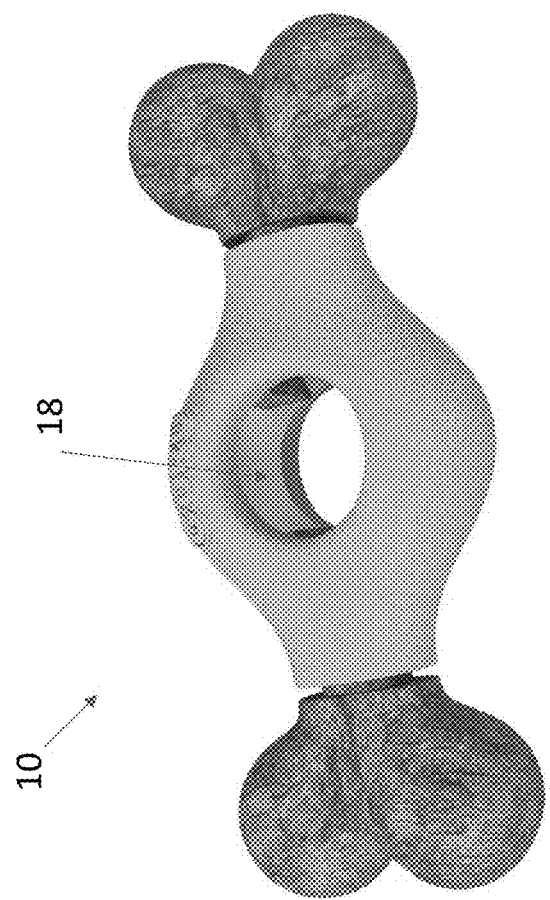
FIG. 8B is the perspective view of the pet toy of FIG. 8A with the adjustable portions in a further opened position.
Figure 8A:
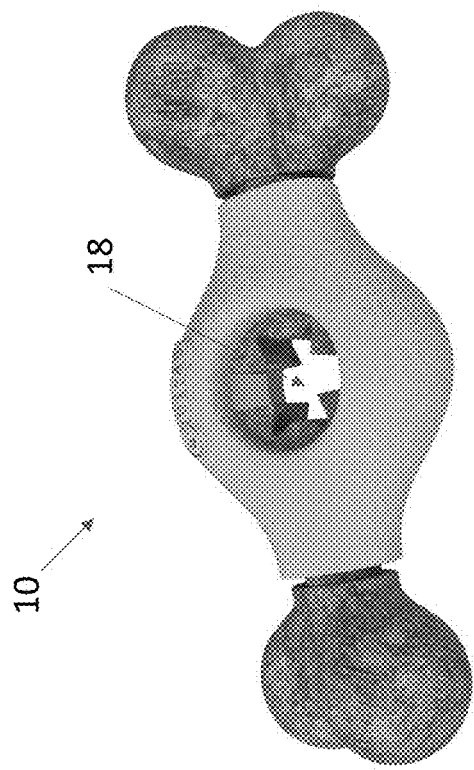
FIG. 8A is a perspective view of the pet toy of FIG. 1 with adjustable portions in a partially closed position.

Adjustment of the through opening 18 may be performed such as to provide clamping forces against the chew 26 by the inner components 16. As illustrated with particular regard to FIGS. 8A-8B, the size of the through opening 18 may be adjusted between a relatively smaller opening (e.g., FIG. 8A; the inner components 16A, 16B are relatively closer to one another shrinking the overall size of the through portion of the hole 18) and a relatively enlarged opening (e.g., FIG. 8B; the inner components 16A, 16B are relatively further from one another increasing the overall size of the through portion of the hole 18). Notably, the toy 10 may be configured to allow the inner components 16A, 16B to be advanced towards one another until contact. FIG. 8A may represent the inner components 16A, 16B being partially advanced.

As illustrated with particular regard to FIGS. 9A-9E, the toy 10 may be configured to accommodate a wide variety of chews 26 of various type, kind, and size, such as but not limited to, star-shaped chews, brush shaped chews, bone, bully sticks, rawhide, combinations thereof, or the like.

The toy 10 is preferably symmetrical, or substantially symmetrical (e.g., without regard to markings, tolerances, +/−10% of dimensions, and other select features) across the X, Y, and Z planes taken through a center of the toy 10 when the outer and inner components 12, 16 are adjusted similarly, though such is not necessarily required.

The toy 10 may be used for any type of pet or animal and any other object, not necessarily just chews 26.

In exemplary embodiments, without limitation, some or all components of the toy 10 may be formed by injection molding. Some or all of the components may comprise one or more polymers, silicone, rubber (e.g., thermoplastic rubber), nylon, wood, a nylon-wood combination, combinations thereof, or the like, by way of non-limiting example. Preferably, at least the exposed portions 11 of the outer components 12 comprise one or more materials (e.g., nylon/wood composite) which is chewable for animals, such as dogs, and the housing 14 comprise thermoplastic rubber.

In exemplary embodiments, without limitation, the toy 10 may be approximately 203.2 mm in length, 84.55 mm in maximum width, and 53 mm in maximum height. The outer components 12 may comprise radii of the outer, bone end shaped portions thereof of approximately 20 mm, a height of 82.5 mm and a length of 49.2 mm. The opening 24 may have a diameter of 41 mm. The housing 14 may have a maximum width of 74.1 mm. The housing 14 may have a wall thickness of approximately 4.5 mm. All dimensions described herein are approximate and provided by way of non-limiting example. As used herein, the term approximate may be understood to mean within (+/−) 20% of the stated value.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

What is claimed is:

1. A pet toy for adjustably accommodating various size and shape food items, said pet toy comprising:
   a housing comprising a first opening and a second opening;
   a first and second outer component, each comprising a first portion extending within said housing, a second portion extending outside of said housing, and a third portion between said first portion and said second portion engaged with said housing;
   a first and second inner component, each located within said housing and engaged with the first portion of a respective one of the first and second outer components; and
   a through aperture defined, at least in part, by the first and second openings of said housing and inward facing surfaces of said first and second inner components, wherein said first and second outer components are configured for axial rotational movement relative to said housing, and wherein said axial rotational movement of said first and second outer components is configured to cause advancement and retraction of said first and second inner component, respectively, along the first portion of the respective one of the first and second outer components within said housing so as to adjust a size of the through aperture.

2. The pet toy of claim 1 wherein:
   said first portion of each of said first and second outer components engage the first and second inner components by way of mating threaded surfaces.

3. The pet toy of claim 2 wherein:
   said first portion of each of said first and second outer components comprises a shaft with a first portion of the mating threaded surfaces; and
   said first and second inner component comprise an aperture with a second portion of the mating threaded surfaces.

4. The pet toy of claim 3 wherein:
   the second portion of each of said first and second outer components comprises a bone-end shape.

5. The pet toy of claim 3 wherein:
   said housing comprises a first side opening and a second side opening; and
   the third portion of each of said first and second outer components comprises an unthreaded section of the shaft which extends through a respective one of the first side opening and the second side opening of said housing and a surface features which frictionally engages a portion of the housing forming the respective one of the first side opening and the second side opening.

6. The pet toy of claim 4 wherein:
   the surface feature comprises one or more of: a ridge and a valley.

7. The pet toy of claim 4 wherein:
   the first opening is located centrally at an upper surface of the housing;
   the second opening is located centrally at a lower surface of the housing;
   the first side aperture is located at a first side of the housing; and
   the second side aperture is located at a second, opposing side of the housing.

8. The pet toy of claim 7 wherein:
   when said first and second inner components are fully retracted, the through aperture is as wide as the first opening and the second opening; and
   when said first and second inner components are at least partially advanced, the through aperture is smaller than the first opening and the second opening.

9. The pet toy of claim 8 wherein:
   when the first and second inner components are fully advanced, at least a portion of the inward facing surfaces of first and second inner components contact one another.

10. The pet toy of claim 9 wherein:
    an inward facing surface of each of said first and second inner components comprises a series of angular surfaces.

11. The pet toy of claim 8 wherein:
    said housing comprises interior walls, each which extend longitudinally along a centerline of the shafts and alongside said first and second inner components to guide said inner components during the advancement and retraction.

12. The pet toy of claim 1 wherein:
    the first and second outer components comprise a wood composite; and
    the housing comprises thermoplastic rubber.

13. The pet toy of claim 12 wherein:
    the housing is provided in two halves which are joined.

14. The pet toy of claim 1 wherein:
    the pet toy is symmetrical about the x, y, and z axis.

15. A method for operating a pet toy to adjustably accommodate various size and shape food items, said pet toy comprising:
    providing the pet toy, said pet toy comprising:
    a housing comprising a first opening and a second opening;
    a first and second outer component, each comprising a first portion extending within said housing, a second portion extending outside of said housing, and a third portion between said first portion and said second portion engaged with said housing;

a first and second inner component, each located within said housing and engaged with the first portion of a respective one of the first and second outer components; and a through aperture defined, at least in part, by the first and second openings of said housing and inward facing surfaces of said first and second inner components, wherein said first and second outer components are configured for axial rotational movement relative to said housing, and wherein said axial rotational movement of said first and second outer components is configured to cause advancement and retraction of said first and second inner component, respectively, along the first portion of the respective one of the first and second outer components within said housing so as to adjust a size of the through aperture;

rotating the first and second outer components relative to said housing to retract said first and second inner components;

placing one of the food items within the through aperture such that the one of the food items extends through the first opening and the second opening; and rotating the first and second outer components relative to said housing until the inward facing surfaces of the first and second inner components contact the one of the food items.

16. The method of claim 15 further comprising:

providing the pet toy with the one of the food items secured therein to a pet.

17. The method of claim 15 further comprising:

providing the housing as two halves; and engaging the threaded surfaces of the first and second outer components with the threaded surfaces of the first and second inner components, respectively; and joining the two halves of the housing about the first and second inner component and the third portion of the first and second outer components.

18. A pet toy for adjustably accommodating various size and shape food items, said pet toy comprising:

a housing comprising an upper central opening, a lower central opening aligned with the upper central opening, a first side opening located at a first side of the housing, and a second side opening located at a second side of the housing opposing the first side of the housing;

a first and second outer component, each comprising a shaft extending within said housing which is partially threaded, a second portion extending outside of said housing, wherein an unthreaded portion of the shaft of the first and second components engages the housing at the first and second side openings, respectively;

a first and second inner component, each located within said housing and comprising an aperture with threaded surfaces which are engaged with the at least partially threaded portion of the shaft of a respective one of the first and second outer components, wherein inward facing surface of each of said first and second inner components comprises a series of relatively angled surfaces; and a through aperture defined, at least in part, by said upper central opening, said lower central opening, and the inward facing surfaces of the first and second inner components, wherein said first and second outer components are configured for axial rotational movement, and wherein said axial rotational movement of said first and second outer components is configured to cause said first and second inner component, respectively, to advance and retract within said housing along the shaft, thereby adjusting a size of the through aperture, wherein said housing comprises interior walls, each which extends alongside said first and second inner components to guide said inner components during said advancement and retraction.

19. The pet toy of claim 18 wherein:

when said first and second inner components are fully retracted, the through aperture is as wide as the first opening and the second opening;

when said first and second inner components are at least partially advanced, the through aperture is smaller than the first opening and the second opening; and when the first and second inner components are fully advanced, at least a portion of the inward facing surfaces of first and second inner components contact one another.

20. The pet toy of claim 19 wherein:

the first and second outer components comprise a wood composite;

the housing comprises thermoplastic rubber;

the housing is provided in two halves which are joined; and the second portion of each of said first and second outer components comprises a bone-end shape.

* * * * *